Aug. 16, 1966 G. HARRIS 3,266,589
FOLDABLE GASOLINE DRIVEN GOLF CART
Filed July 14, 1964 7 Sheets-Sheet 1

INVENTOR,
Gerald Harris.
BY
Harness, Dickey & Pierce
ATTORNEYS

Aug. 16, 1966          G. HARRIS          3,266,589
FOLDABLE GASOLINE DRIVEN GOLF CART
Filed July 14, 1964                      7 Sheets-Sheet 2

INVENTOR.
Gerald Harris
BY
Harness, Dickey & Pierce
ATTORNEYS

United States Patent Office 3,266,589
Patented August 16, 1966

3,266,589
FOLDABLE GASOLINE DRIVEN GOLF CART
Gerald Harris, 8015 Agnes St., Detroit, Mich. 48214
Filed July 14, 1964, Ser. No. 382,451
22 Claims. (Cl. 180—27)

This invention relates to self-propelled golf carts, and particularly to a self-propelled golf cart which is foldable into a small package for storage and transportation.

Golf carts having a body incorporating seats and areas for carrying golf bags, have been provided in the trade for quite some time. Such carts are usually stored in garage-like buildings having battery charging facilities and thereby substantially limits the number of carts which can be owned by the membership of a golf club. Such problem becomes more acute when the Club has carts to rent to the member so that the facilities for privately owned carts are very limited.

The present invention pertains to a cart having the capacity of the carts now being employed by the Clubs but which is foldable into a small package and made of light materials so that it can be easily lifted into the trunk of an automobile. It is contemplated that such a package would not weigh more than 75 pounds or occupy a space greater than approximately 20 x 20 x 38 inches because of the compact folding. The electric drive usually employed is not practical for the present cart because of the weight and volume of the batteries. A two-cycle engine is employed for driving the cart as it requires no oil in the crankcase which could leak out when the cart is folded and stored in different positions. A direct pull cord or a trip inertia starter is used with the engine, although it is to be understood that a starter with a small battery could be provided without adding any substantial weight to the cart.

The cart preferably has three wheels, two of which are mounted on an axle which carries a frame for the engine, the seats and the drive for the axle. A third wheel is connected to the frame by a pivoted arm which permits it to be swung into substantial alignment with the pair of wheels. The single wheel may trail the two driven wheels or may extend forwardly thereof to be employed as the steering wheel for the cart. A pair of seats is provided on the frame along with a foot supporting board which may be individual to the seats or which may extend across the frame as a unit element. This footboard has a throttle and brake lever thereon all of which folds against the frame along with the seats to substantially reduce the size of the cart when collapsed for storage or transportation.

The frame is preferably made from aluminum or light tubing and the seat and back are preferably pressed from sheets of the same material to provide lightness to the assembly. Foldable elements support U-shaped members on each side of the steering wheel supporting arm for supporting a pair of golf bags.

Accordingly, the main objects of the invention are: to provide a motor driven golf cart which is light in weight and collapsible into a small package; to construct a cart from an axle, a pair of wheels, an engine and a pair of foldable seats mounted on a frame to which a swingable arm is pivoted containing a steering wheel; to provide a frame for a three-wheel cart made from light tubing which supports an engine for driving a pair of the wheels and a pivoted arm to which a third wheel for steering is attached and movable into substantial alignment with the pair of driven wheels when the arm is folded against the frame; to provide a three-wheel golf cart having a frame, an engine, a pair of seats, a foot supporting platform, a pivoted arm for spacing a steering wheel from said frame and wheels on an axle, all of which are attached to said frame and parts of which are swingable against said frame to form a small package for storage and transportation, and in general, to provide a light weight collapsible golf cart which is simple in construction and economical of manufacture.

Other objects and features of novelty of the invention will be specifically pointed out or will become apparent when referring, for a better understanding of the invention, to the following description taken in conjunction with the accompanying drawings, wherein.

Referring to FIGS. 1 to 13, the foldable golf cart 21 is illustrated as having a pair of wheels 22 and 23 mounted on a two-piece axle 24 driven through a differential 25 by a sprocket wheel 26 from a chain 27. Adjacent to each of the wheels, a bracket 28 is supported on the axle 24 with a coil spring 29 thereon engaging an angle plate 31. The plates are attached to legs 32 and 33 which extend from a cross bar 34 forming an A-frame which is supported by the axle 24. A pair of angle shaped legs 35 extend downwardly from the cross bar 34 between the legs 33. The lower end of the legs 33 are extended forwardly and with the legs 35 are attached to a cross bar 36 forwardly of the axle 24. The legs 32 are interconnected by a cross member 37 and a brace 38 which connects one of the legs 32 to the cross member 37. A pair of brace members 39 connect the cross member 37 with the legs 33 to provide further strength to the A-frame.

The pair of legs 35, each have a triangular bracket 41 riveted or otherwise secured thereto to provide space supports for a shaft 42 having a small sprocket 43, a brake drum 44 and a large sprocket 45 thereon.

Figure 2:
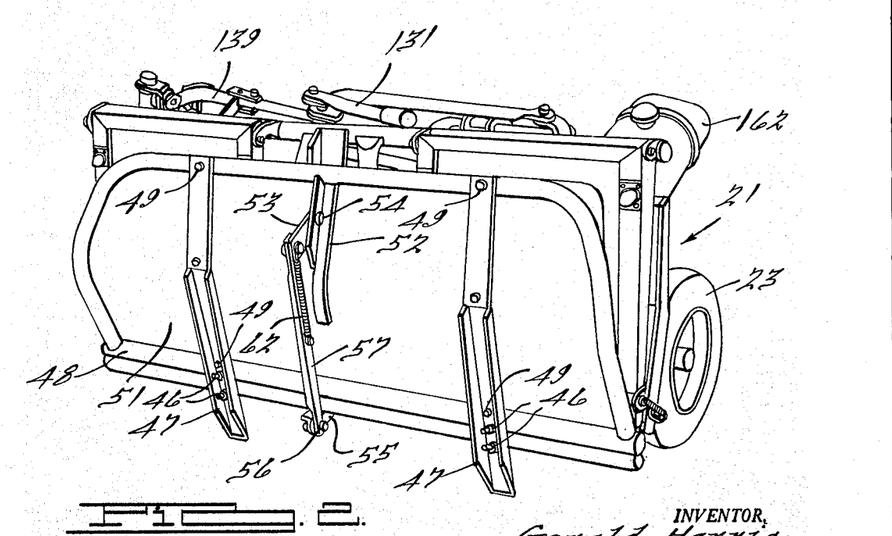
FIG. 2 is a front perspective view of the cart shown with the parts in folded relation.
Figure 4:
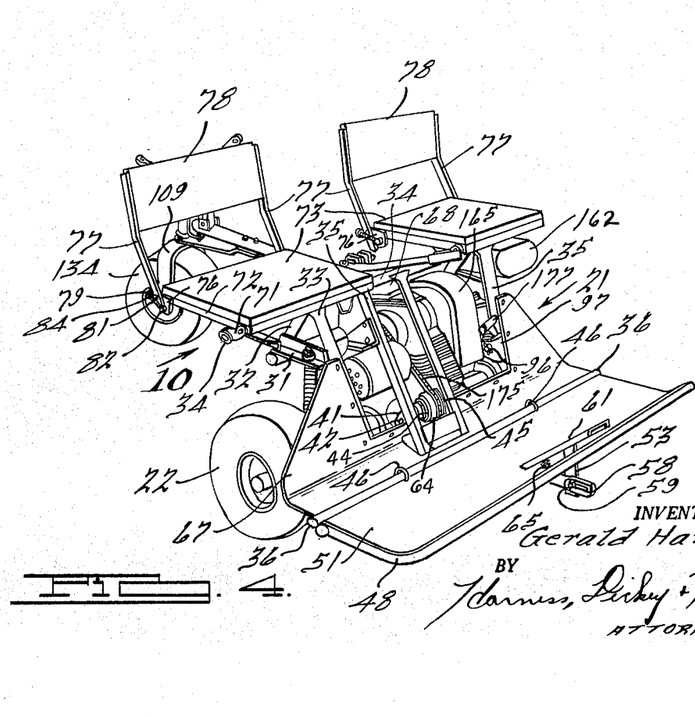
FIG. 4 is a front perspective view of the cart illustrated in FIG. 3.

A pair of U-shaped bolts 46 are hooked over the cross member 36 and are secured to a pair of angle members 47, as illustrated in FIG. 2 to form pivots therefor. The angle members 47 have a frame 48 secured thereto by bolts 49, and an angle shaped plate 51 is secured to the frame 48 to form a foot rest for the occupants of the cart. An angle bracket 52 is welded, bolted or otherwise secured to the plate 51 to which an arm 53 is secured by a pivot 54 for operating the throttle and the brake. A pull and push bar 55 is secured by a pivot 56 to a link 57, the forward end having a slot 58, as illustrated in FIG. 4, through which a rivet or bolt 59 extends when secured in an aperture in the end of the arm 53. This provides a lost motion connection between the arm 53 and link 57 which permits the pivoting of the frame 48 upwardly from foot rest position to folded position, as illustrated in FIGS. 2 and 4. The end of the arm 53 extending through the plate 51 and carries a foot plate 61 for rocking the arm to produce a braking action when the top part is rocked downwardly and which accelerates the engine when the lower portion of the plate is rocked downwardly. When the lower portion is rocked downwardly, the arm 53 pulls on a spring 62 to apply a force to the link 55 to control the pressure on the engine throttle through the spring rather than directly through the link.

Figure 1:
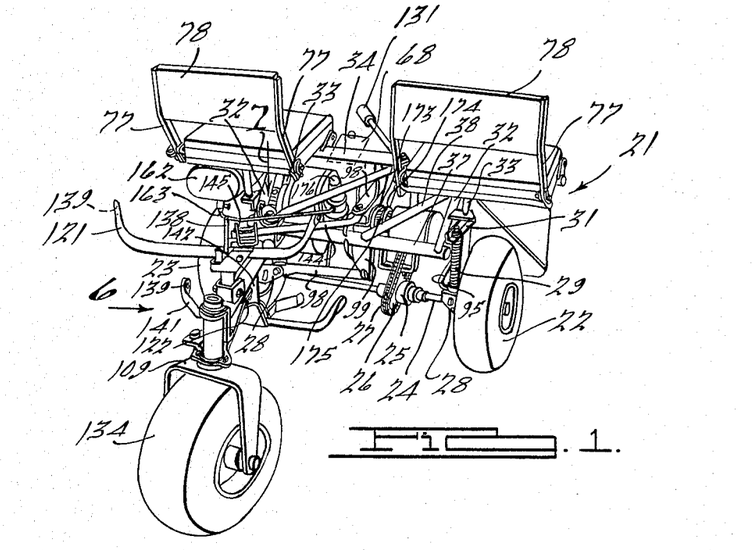
FIGURE 1 is a rear perspective view of the cart of the present invention.
Figure 3:
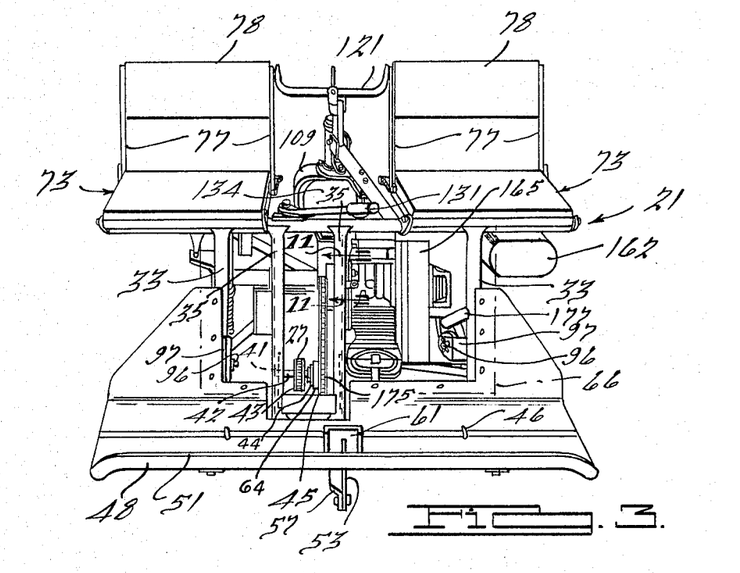
FIG. 3 is a front view of the cart illustrated in FIG. 1.

The brake drum 44 has a brake band 64 thereabout which is connected to the end of the link 55 and is drawn against the drum when the top portion of the plate 61 is urged downwardly which automatically occurs by the force in a spring 65 when the foot is removed from the plate 61. The pull and push bar 55 is connected to the carburetor 176 and when moved away from the drum 64 operates the throttle of the carburetor to run the engine at increased speed. As illustrated in FIGS. 3 and 4 by dot and dash line, a cover plate 66 is removably secured to an angular shaped cover plate 67 which is attached to the arms 33 and the cross member 36. As illustrated in FIG. 1, a pencil and card holder 68 extends forwardly of the plate 66 secured to the central portion of the cross bar 34 of the A-frame.

Figures 8, 9, 10:
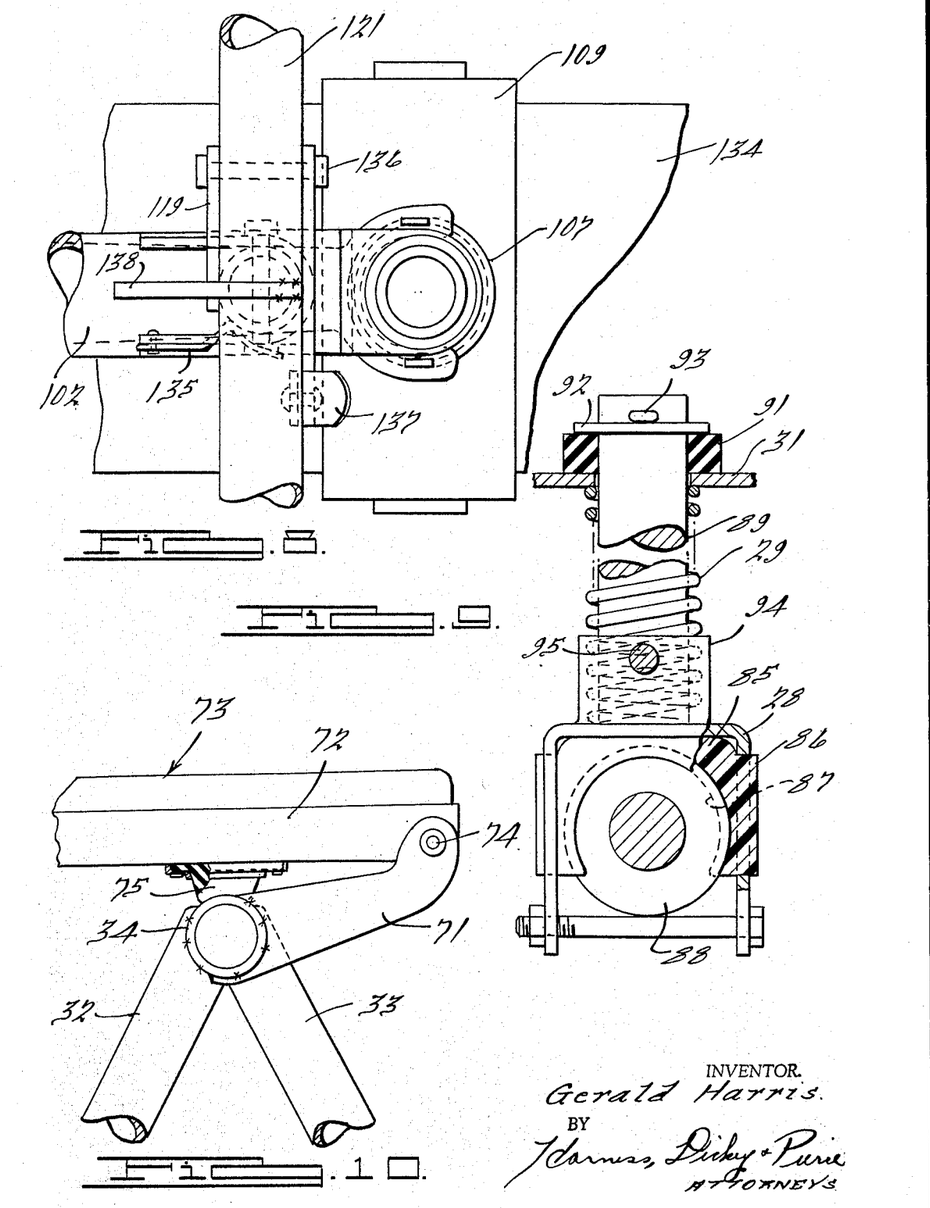
FIG. 8 is an enlarged broken view of the structure illustrated in FIG. 6, as viewed from the point 8 thereof.
FIG. 9 is an enlarged broken sectional view of the structure illustrated in FIG. 5, taken on the line 9—9 thereof.
FIG. 10 is an enlarged broken view of the structure illustrated in FIG. 4, as viewed from point 10 thereof.
Figure 11:
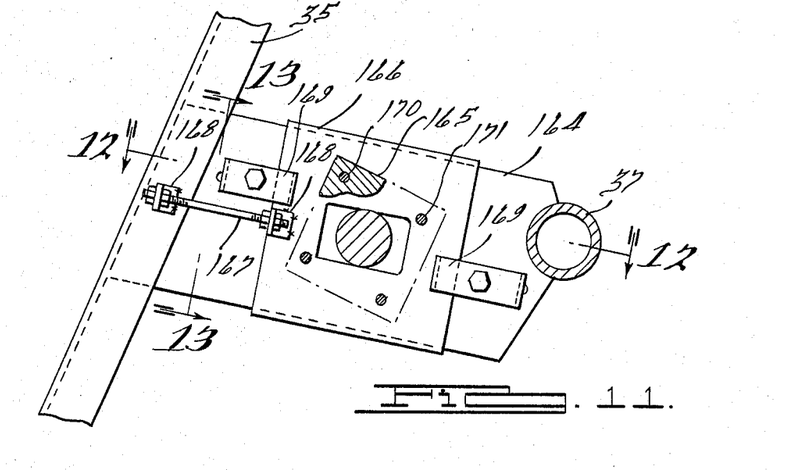
FIG. 11 is an enlarged broken sectional view of the structure illustrated in FIG. 3, taken on the line 11—11 thereof.
Figure 12:
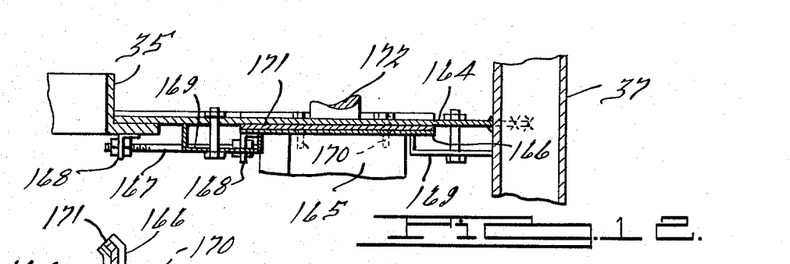
FIG. 12 is a sectional view of the structure illustrated in FIG. 11, taken on the line 12—12 thereof.
Figure 13:
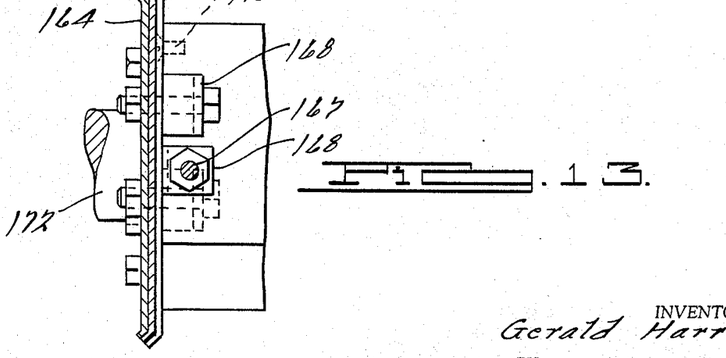
FIG. 13 is an enlarged sectional view of the structure illustrated in FIG. 11, taken on the line 13—13 thereof.

As illustrated more specifically, in FIGS. 4 and 10, four arms 71 are secured to the cross member 34 of the A-frame, the outer pairs of which are spaced apart to receive the base frame 72 of a seat 73 which is secured thereto by pivots 74. Resilient buffers 75 are secured to the bottom of the frame 72 in alignment with the cross member 34 with which the buffers engage when the seats are in seating position. At the rear end of each frame 72, plates 76 are supported to which arms 77 of a back rest 78 are secured by pivots 79. One end of a spring 81 is secured to a stop element 82 against which the bottom of the arms 77 abut when the back rest 78 is in seating position. The back rest is retained in this position when the spring 81 moves to overcenter position when the other end is secured to a finger 84 extending outwardly of the arms 77 adjacent to the pivot 79. When the seat back 78 is tilted forward, the spring is carried above the pivot 79 and thereby retains the back rest in folded relation on the seat frame 72. When the cart is folded in carrying position, the back rest is pivoted against the seat frame 72 held by the overcenter portion of the spring 81 and the frame and back rest are tilted forwardly over the cover plates 66 and 67 to be enclosed by the foot rest plate 51 when the frame 48 is tilted upwardly, as illustrated in FIG. 2.

Referring more specifically to FIG. 9, the bracket 28 on the axle 24 has a plastic insert 85 therin secured rigidly thereto by projections 86 extending through rectangular recess 87 for receiving a ball or other type of bearing 88, with the lower part of the recess widened to permit the tilting of the axle and bearing within the plastic insert 85. The bracket 28 has an upstanding element 89 which is tilted slightly toward the center of the A-frame and over which the spring 29 is disposed. The angle plate 31 secured to the legs 32 and 33 has the horizontal flange extending inwardly and provided with aperture through which the element 89 projects with the spring abutting the bottom face of the flange. An elastic buffer washer 91 extends over the upper end of the element 89 and rests upon the horizontal flange of the angle bracket 31 urged thereagainst by a metal washer 92 retained in position by a pin 93 which extends through the upper end of the element 89. The entire A-frame is supported by the coil springs 29 and provides resiliency to the ride. When a bump is encountered which forces the element 89 upwardly through the aperture in the angle plate 31, the resilient buffer 91 will strike the upper face of the plate 31 and prevent substantial shock from occurring to the frame upon rebound.

A block 94 is welded or otherwise secured to each bracket 28 to which an end 95 of a radius rod 96 is pivoted. The opposite end of each of the rods 96 is pivoted to a plate 97 secured to the legs 33, as illustrated in FIG. 3. By having both ends of the rods 96 pivoting, the axle can move up and down but is restrained from moving forwardly and rearwardly of the frame. One of the brackets 28, as illustrated in FIG. 1, has a radius rod 98 pivoted thereto crosswise of the frame with the opposite end pivoted to a bracket 99 secured to the central part of the frame for controlling the lateral movement of the axle relative thereto.

Figures 6, 7, 18, 19:
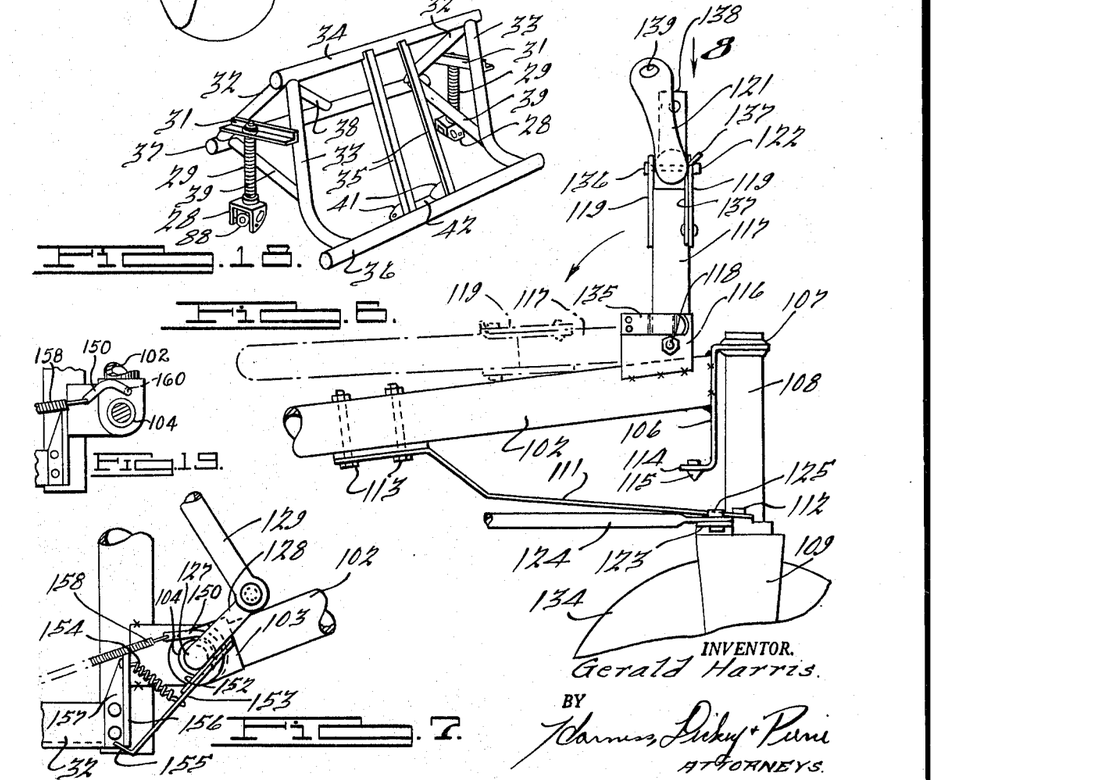
FIG. 6 is an enlarged broken view of the structure illustrated in FIG. 1, as viewed from the point 6 thereof.
FIG. 7 is an enlarged broken view of the structure illustrated in FIG. 1, as viewed from the point 7 thereof.
FIG. 18 is a perspective view of the frame, employed in the cart of FIGS. 1 to 13.
FIG. 19 is a view of the structure of FIG. 7 with the cart in folded position and with parts removed.

The left hand side of the A-frame has a pair of spaced horizontal plates 101 welded or otherwise secured to the cross member 37, between which a steering wheel supporting arm 102 is secured. U-shaped yoke 103 is attached to one end of the arm which straddles the plates 101 and is pivoted thereto by a hollow pin 104 as illustrated in FIGS. 6 and 7. The supporting arm 102 has a Z-shaped bracket 106 thereon, the one end 107 slidably receiving the fork crown 108 of the wheel supporting fork 109. The fork is attached to a flat spring 111 by bolts 112 and bolts 113 secure the opposite end of the flat spring 111 to the arm 102. The lower flange 114 of the bracket 106 supports a resilient bumper 115 which is engaged by the spring when the crown 108 moves upwardly through the aperture of the flange 107. A pair of plates 116 is secured to the forward end of the arm 102 having an arm 117 secured thereto by a pivot 118. The other end of the arm 117 supports a pair of plates 119 in which a U-shaped bracket 121 is secured by a pivot 122. The U-shaped bracket 121 supports the front end of a pair of golf bags when in horizontal position, as illustrated in FIG. 6.

The fork 109 has an extending plate 123 at the top thereof to which the end of a rod 124 is secured by a bolt 125. The rod 124 has its opposite end secured to an arm 126 fixed to a pin 127 which extends through the hollow pin 104 and has a crank arm 128 integral with or otherwise attached to the top end thereof. The crank arm 128 is pivoted to a link 129 which has its opposite end pivoted to a steering handle 131 which is secured by a bolt 132 to the cross member 34, as clearly illustrated in FIG. 5. By moving the steering handle 131 laterally between the seats, the fork 109 is turned to steer the wheel 134 which is supported thereby. When the arm 117 is in upstanding position relative to the arm 102, as illustrated in FIG. 6, a leaf spring 135 has an arcuate portion engaging the rear side of the arm 117 to prevent it from hinging backwardly onto the arm 102. When in vertical position the U-shaped bracket 121 is pivoted on the pin 122 back to horizontal position being retained therein by the end of a pin 136 which passes through a slot in a spring finger 137. When the arm 102 is moved into a position substantially parallel to the A-frame, the arm 117 is pivoted downwardly to the dot and dash position illustrated in FIG. 6 and the bracket 121 is swung into a position substantially parallel to the arm 117. A dividing bar 138 extends centrally of the bracket 121 to divide the space so that two bags can rest thereon. The bar 138 as well as the ends of the bracket 121 have apertures 139 therein for straps which secure the bags in fixed position relative thereto.

A U-shaped bag supporting bracket 141 is supported on an arm 142 which is pivoted in apertures through a pair of plates 143 welded or otherwise secured to the steering wheel supporting arm 102. The element 141 is retained in a position substantially parallel to the driving axle by an L-shaped rod 144 which extends through apertures in a yoke 145 welded or otherwise secured to the upper end of the arm 142. The angle branch 146 of the rod 144 is pivoted to the upper portion 98' of the supporting bracket 99 as illustrated in FIG. 1. The opposite end of the rod 144 has a notch 147 therein which engages an arm of the yoke 145 when urged downwardly by an arced leaf spring 148 which has its end supported within the apertures of the yoke 145. This not only retains the bag supporting bracket 141 in position to receive the bottom portion of the bags, but also locks the wheel supporting arm 102 in steering position. Plates 149 which connect the arm 142 to the bracket 141 also support arms 151 against which the bottom ends of the bags abut when supported by the brackets 141 and 121. The ends of the brackets 141 are also provided with the apertures 139 for supporting the straps which retain the bottom end of the bags in fixed position on the bracket 141.

Figure 5:
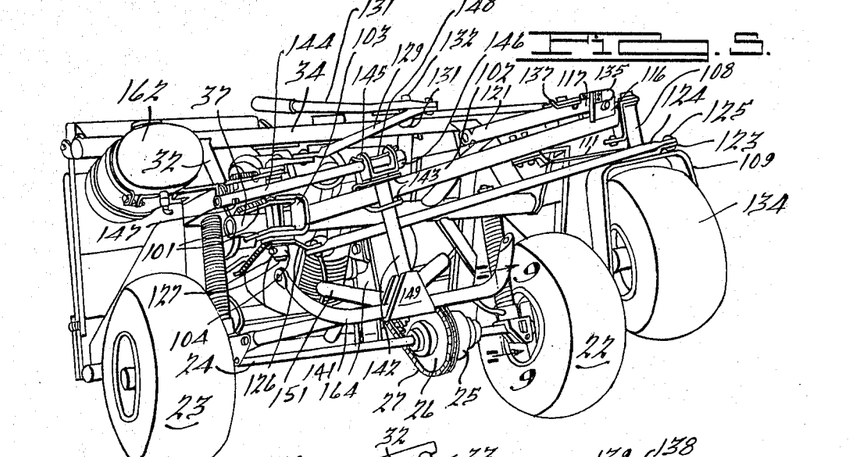
FIG. 5 is a rear perspective view of the folded cart illustrated in FIG. 2.

As illustrated in FIG. 7, the crank arm 128, on the upper end of the pin 127, has a plate 152 welded or otherwise secured thereto, against which a plate 153 is urged by a spring 154. The plate 153 has a flanged end 155 which receives a flange 156 of a bracket 157 which is riveted or otherwise secured to an adjacent end of the leg 32. The flange 156 supports the opposite end of the spring 154. When the arm 128 is rotated clockwise, as illustrated in FIG. 7, the spring 154 will exert a force on the upper end of the plate 152 to urge the arm back to neutral position. When rotated in a counterclockwise direction, the lower end of the plate 152 has pressure applied thereto to return the arm to the neutral position to center the wheel 134 between right and left steering positions. As further illustrated in FIG. 7, an L-shaped link 150 has a downwardly presenting finger which extends into an aperture 160 in the top of the yoke 103, the opposite end being secured to a coil spring 158, attached to the leg 32. The spring exerts a force on the link 150 to assist in rotating the yoke 103 about the pin 104 from steering to folded positions. In FIG. 7 the link 150 is shown when the cart is in steering position. In FIG. 19 the link 150 is shown when the cart is in folded position. To effect such a movement, the rod 144 is moved upwardly to release the notch 147 from the yoke 145 whereupon the tension in the spring 158 assists the movement of the arm 102 to folded position, as illustrated in FIG. 5. In this position the wheel 134 is disposed in substantial alignment with the two wheels 22 and 23 pivotally mounted on the axle 24 to which they are secured in the usual manner.

The differential 25 of the axle 24 is driven by the sprocket wheel 26 from the chain 27 and sprocket wheel 43 on the shaft 42. An engine mounting plate 164 is secured to the mounting plate 99, to the cross member 37 and to the leg 35 located adjacent to the center of the A-frame. The base of the engine 165 is bolted or otherwise secured to a slide 166 which is supported on the engine mounting plate 164. The slide 166 is adjustable along the mounting plate 164 by a screw 167 extending through apertures in upstanding flanges of angle elements 168, one secured to the slide 166, the other secured to the leg 35. A pair of fingers 169 retain the slide 166 in sliding relationship with the mounting plate 164. The plate 166, secured to the base of the motor by pluralities of screw 170, has a gasket of vibration reducing material 171 bonded or otherwise secured thereto. The engine has a shaft 172 which extends through an elongated slot in the engine mounting plate 164. A centrifugal clutch 173 is secured to the shaft 172, which supports small sprocket wheel 174 for driving a chain 175. The chain 175 drives the sprocket wheel 45 which drives the sprocket wheel 43 and the shaft 42, providing a gear reduction from the shaft 172 of the engine to the axle 24. A gas tank 162 is supported on the A-frame under the left hand seat having a conduit 163 connected to a carburetor 176 of the engine. As illustrated in FIG. 4, a handle 177 on a pull cord wound on a pulley adjacent to a flywheel of the engine is disposed under the left hand seat of the cart in position to be pulled by the occupant for starting the engine. As pointed out herein above, a spring trip starter or a battery operated starter may be substituted for the pull cord if one should feel this is desirable.

When the cart is in riding position as illustrated in FIGS. 3 and 4, the engine is started by a pull on the handle 177. By increasing the speed of the engine, the centrifugal clutch will be engaged and the vehicle will be propelled forwardly. The vehicle is steered by the lateral movement of the handle 131 which turns the fork 109 and wheel 134 supported thereby. When tilting the foot plate 61 rearwardly, the flow of gasoline to the carburetor is increased and when the plate is tilted forwardly the speed of the engine will decrease until the clutch will be released and the brake will be automatically applied by the spring 65. A force on the front end of the plate 61 will produce its forward rotation and provide a greater braking control for the driver. Through the movement of the foot plate 61 the starting, stopping, the speed of operation and the braking of the cart is effected.

After the cart has been used, it is driven to the parking lot and stopped adjacent to the trunk of the owner's automobile. The seats are folded together and forwardly against the closure plates 66 and 67, and the foot plate 51 on the frame 48 is pivoted upwardly thereagainst. Thereafter the bracket 121 and the arm 117 is released and swung downwardly against the arm 102, the pin 136 is released from the spring 137 and the bracket 121 is swung into a position parallel to the arm 117. The rod 144 is raised to release the notch 147 from engagement with the yoke 145, permitting the spring 158 to exert a force on the yoke 103 through the angle link 150 which assists in swinging the arm 102 into a position substantially parallel to the A-frame with the wheel 134 substantially in alignment with the wheels 22 and 23. It will be noted during the swinging movement that the rear bag supporting element 141 has been retained in parallel position to the A-frame. When the cart is folded, the spring 158 retains the elements in folded position in nested relation to each other. The folded cart may then be lifted by one person, or at most two, into the trunk of the automobile for transportation.

A bag may be provided for receiving the collapsed cart which is closed with a zipper and provided with a pair of slats on one side which permits the bag to be tilted against the rear panel of the compartment against which it will rest until the opposite end is raised and the entire package slid on the slats across the edge of the compartment into a position therewithin. Not only does such runner arrangement permit one person to deposit the folded cart within the compartment but the use of the runners protects the various elements of the cart from damage on the edge of the compartment when slid thereover. When the arm 102 is being swung to collapsed position, the rod 124 moves the arm 126 counterclockwise which moves the arm 128 also counterclockwise moving the link 129 outwardly and thereby swings the handle 131 counterclockwise into position parallel to the cross member 34. This retains the rod 124 in fixed position with the wheel 134 disposed substantially right angles to the arm 102, in parallel relationship to the wheel 23, as illustrated in FIG. 5. The movement of the arm 102 is done manually assisted by the tension of the spring 158 acting through the angle link 127, as pointed out hereinabove. The reverse movement of the arm 102 moves the wheel 134 into steering position as illustrated in FIG. 6. During this operation, the handle 131 is returned to a position substantially perpendicular to the cross member 34 between the seats.

Figure 14:
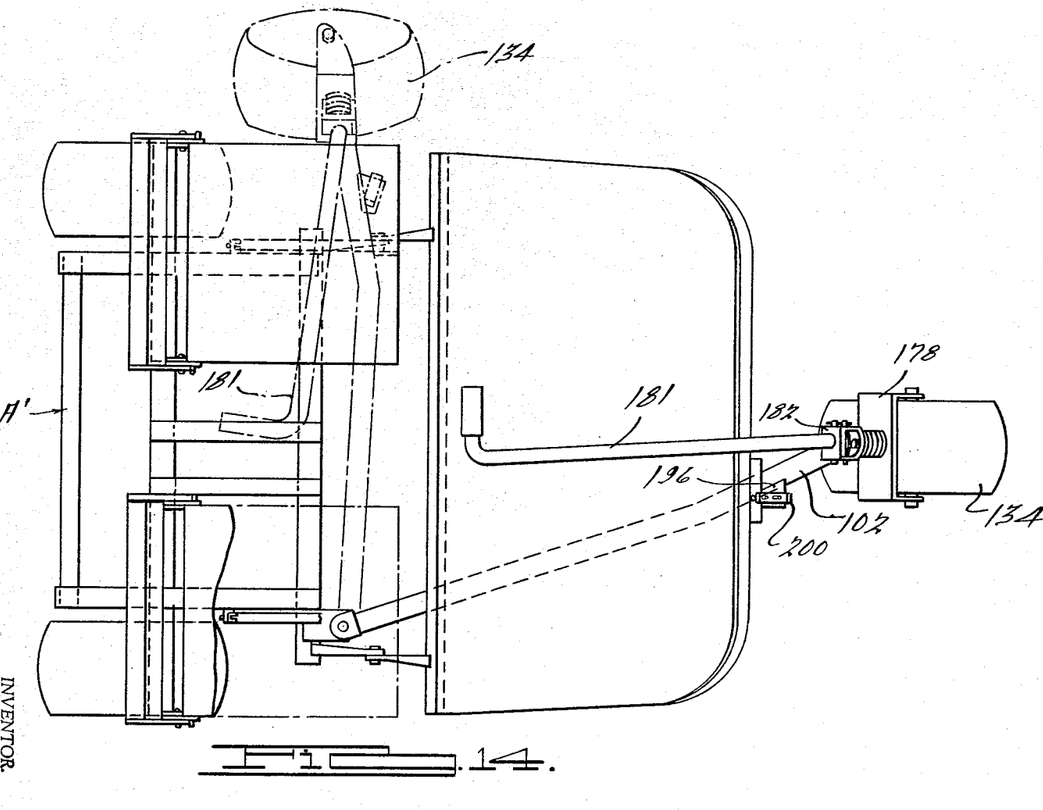
FIG. 14 is a plan view of structure similar to that illustrated in FIG. 3, showing another form which the invention may assume.
Figures 15, 16, 17:
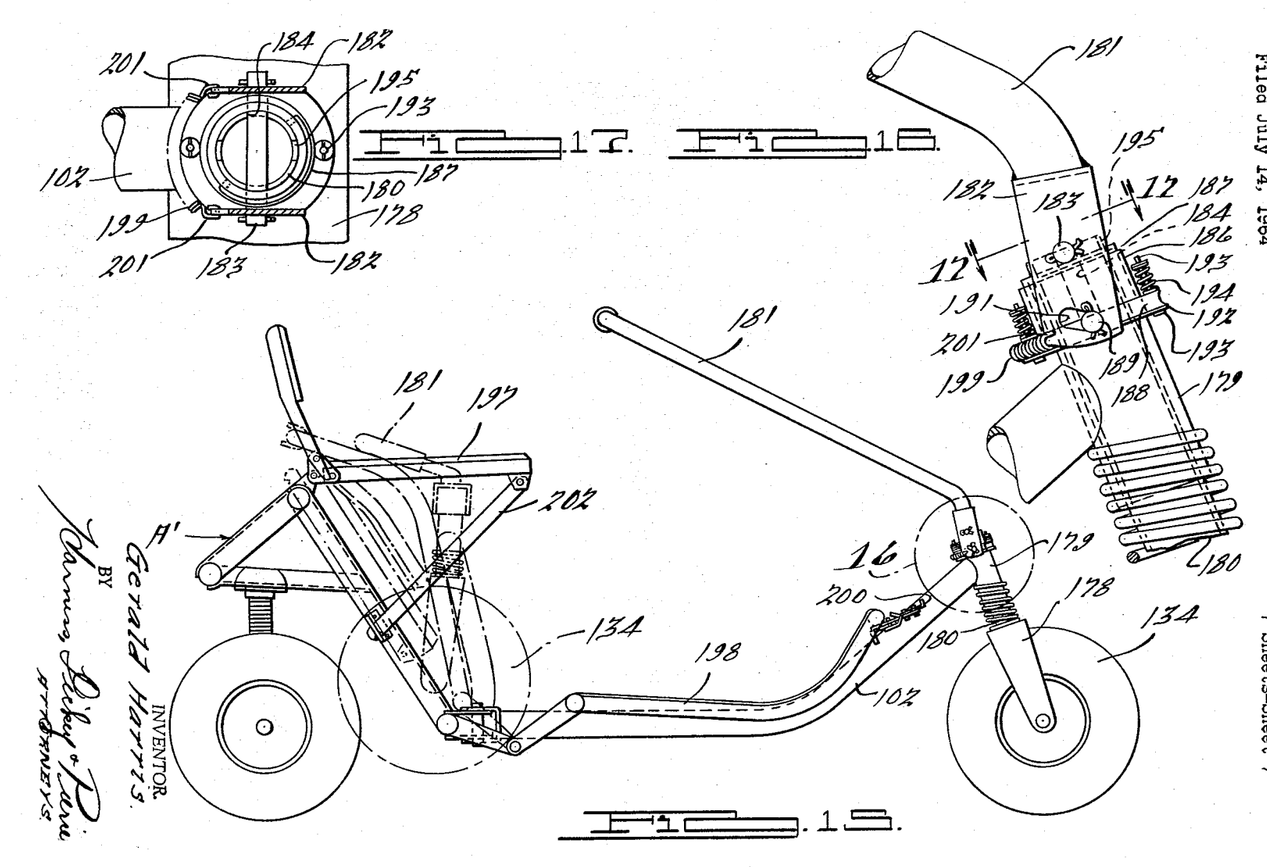
FIG. 15 is a side view of the structure illustrated in FIG. 14.
FIG. 16 is an enlarged broken view of the structure illustrated in FIG. 15, as viewed within the circle 16 thereof.
FIG. 17 is a sectional view of the structure illustrated in FIG. 16 taken on the line 17—17 thereof.

It is to be understood that the cart design is not limited to having the wheel 134 positioned rearwardly of the A-frame, although certain advantages have been found for this arrangement. As illustrated in FIGS. 14 to 17, the wheel 134 on the arm 102 is arranged to extend forwardly of the A-frame. In this arrangement the crown 180 of a fork 178 extending through a tube 179 and is joined to a steering handle 181 by a yoke 182 at the end of the handle which spans the tube 179. A pin 183 extends through apertures in the arms of the yoke 182 and through oppositely disposed slots 184 in the upper end of the crown 180. When the yoke is turned, the crown and fork will turn therewith even though the crown has moved upwardly in the tube 179. A sleeve 186 is disposed over the upper end of the tube 179, retained against removal by a lock ring 187. A ring 188, having a convex periphery and a pair of trunnions 189, the latter of which extend within angularly disposed slots 191 near the ends of the arms of the yoke 182. A washer 192 is secured to the bottom of the ring 188 by bolts 193 which draws the washer upwardly against the ring 188 when urged by the springs 194 provided thereon. This arrangement permits the yoke 182 to be raised upwardly carrying the ring 188 therewith so that it can be turned 180° to permit the pin 183 to drop into diametrically disposed slots 195 located 90° from the slots 184. In such a position the handle will be moved into nested relation with the A-frame as illustrated in FIGS. 14 and 15. It will be noted in FIGS. 14 and 15 that a catch 196 carried by the bar 102 engages a locking device 200, which secures the arm 102 in forward steering position. The seat 197 has a back folded upon the seat which folds downwardly, in which position the foot supporting panel 198 is moved upwardly thereover in a manner as pointed out hereinabove. The yoke 182 is drawn rearwardly by a spring 199 which is nested in the concave face of the ring 188 on the rear side thereof secured by hook ends 201 extending in apertures in the bottom of the yoke arms. The spring 199 urges the handle 181 upwardly to steering position as illustrated in FIG. 15 without interfering with its movement to folded position, as illustrated in FIG. 14.

When the cart is to be driven, the arm 102 is swung outwardly, the foot supporting panel 198 is swung downwardly and the seats 197 are moved upwardly and secured in seating position by links 202 which supports the seats in substantially horizontal position as illustrated in FIG. 15. Otherwise, the construction of the cart of FIGS. 14 to 17 with the arm 102 and wheel 134 disposed forwardly follows substantially the same construction as that heretofore described with regard to the structure of FIGS. 1 to 13.

What is claimed is:

1. In a golf cart, an axle, a frame on said axle, a pair of wheels on said axle, an engine on said frame, means driven by said engine for driving said axle and wheels, an arm having one end pivoted to one side of the frame with the other end swingable to a position adjacent to the other side thereof, steering means on said arm, and a wheel on said steering means.

2. In a golf cart, an axle, a frame on said axle, a pair of wheels on said axle, an engine on said frame, means driven by said engine for driving said axle and wheels, an arm pivoted on the frame swingable thereagainst, steering means on said arm, a wheel on said steering means, and seat means on said cart which is foldable against said frame.

3. In a golf cart, an axle, a frame on said axle, a pair of wheels on said axle, an engine on said frame, means driven by said engine for driving said axle and wheels, an arm pivoted at one end to one side of the frame with the other end swingable to a position adjacent to the other side thereof, steering means on said arm, a wheel on said steering means, seat means on said cart which folds against said frame and a supporting platform forwardly of the frame and foldable thereagainst over said seat means when the latter is in folded position.

4. In a golf cart, an axle, a frame on said axle, a pair of wheels on said axle, an engine on said frame, means driven by said engine for driving said axle and wheels, an arm pivoted on the frame swingable thereagainst, steering means on said arm, a wheel on said steering means, seat means on said cart which folds against said frame, a supporting platform forwardly of the frame and foldable thereagainst over said foldable seat means, and a steering handle connected to said steering means located between a pair of said seat means.

5. In a golf cart, an axle, a frame on said axle, a pair of wheels on said axle, an engine on said frame, means driven by said engine for driving said axle and wheels, an arm pivoted on the frame swingable thereagainst, steering means on said arm, a wheel on said steering means, seat means on said cart which folds against said frame, a supporting platform forwardly of the frame and foldable thereagainst over said foldable seat means, and a brake accelerator pedal on said platform by which the cart is controlled.

6. In a golf cart, an axle, a frame on said axle, a pair of wheels on said axle, an engine on said frame, means driven by said engine for driving said axle and wheels, an arm pivoted on the frame swingable thereagainst, steering means on said arm, a wheel on said steering means, seat means on said cart which folds against said frame, a supporting platform forwardly of the frame and foldable thereagainst over said foldable seat means, a brake accelerator pedal on said platform by which the cart is controlled, and golf bag supporting means on said pivoted arm extending outwardly thereof when the arm is in steering position and in folded position relative thereto when the cart is in folded position.

7. In a golf cart, an axle, a frame on said axle, a pair of wheels on said axle, an engine on said frame, means driven by said engine for driving said axle and wheels, an arm having one end pivoted to one side of the frame with the other end swingable to a position adjacent to the other side thereof, steering means on said arm, a wheel on said steering means, and spring means connected to said pivoted arm for assisting in swinging the arm to folded position.

8. In a golf cart, an axle, a frame on said axle, a pair of wheels on said axle, an engine on said frame, means driven by said engine for driving said axle and wheels, an arm pivoted on the frame swingable thereagainst, steering means on said arm, a wheel on said steering means, seat means on said cart which is foldable against said frame, a supporting platform forwardly of the frame and foldable thereagainst over said foldable seat means, a brake accelerator pedal on said platform by which the cart is controlled, golf bag supporting means on said pivoted arm extending outwardly thereof when the arm is in steering position and in folded position relative thereto when the cart is in folded position, and link means connected to said golf bag supporting arms for swinging them into folded position when the pivoted arm is moved to folded position.

9. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm having one end pivoted to one side of said A-frame for extending outwardly therefrom with the other end movable to a position adjacent the other side thereof, steering means mounted on the outer end of said pivoted arm, and a wheel supported in said steering means which overlaps one of said axle wheels when the arm is adjacent to said A-frame.

10. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm pivoted to said A-frame for extending outwardly therefrom and for movement to a position adjacent thereto, steering means mounted on the outer end of said pivoted arm, a wheel supported in said steering means, and spring means connected between said steering means and said pivoted arm.

11. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm pivoted to said A-frame for extending outwardly therefrom and for movement to a position adjacent thereto, steering means mounted on the outer end of said pivoted arm, a wheel supported in said steering means, spring means connected between said steering means and said pivoted arm, means for turning said steering means, and a handle on said A-frame for operating said turning means.

12. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm pivoted to said A-frame for extending outwardly therefrom and for movement to a position adjacent thereto, steering means mounted on the outer end of said pivoted arm, a wheel supported in said steering means, spring means connected between said steering means and said pivoted arm, means for turning said steering means, a handle on said A-frame for operating said turning means, and a pair of foldable seats on said A-frame which are foldable downwardly thereagainst.

13. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm pivoted to said A-frame for extending outwardly therefrom and for movement to a position adjacent thereto, steering means mounted on the outer end of said pivoted arm, a wheel supported in said steering means, spring means connected between said steering means and said pivoted arm, means for turning said steering means, a handle on said A-frame for operating said turning means, a pair of foldable seats on said A-frame which are foldable downwardly thereagainst, and a platform on the lower end of said A-frame extending forwardly thereof for supporting the feet of the occupant of the seats which are foldable upwardly adjacent to said A-frame.

14. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm pivoted to said A-frame for extending outwardly therefrom and for movement to a position adjacent thereto, steering means mounted on the outer end of said pivoted arm, a wheel supported in said steering means, spring means connected between said steering means and said pivoted arm, means for turning said steering means, a handle on said A-frame for operating said turning means, a pair of foldable seats on said A-frame which are foldable downwardly thereagainst, a platform on the lower end of said A-frame extending forwardly thereof for supporting the feet of the occupant of the seats which are foldable upwardly adjacent to said A-frame, a unit clutch and brake pedal pivoted to said platform, a brake on said axle, a carburetor on said engine, and means connecting said brake and carburetor to said pedal whereby the movement of the pedal in one direction will operate the carburetor to operate the engine and when moved in the opposite direction, will operate the brake.

15. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm pivoted to one side of said A-frame for extending outwardly therefrom and for movement to a position adjacent to the other side thereof, steering means mounted on the outer end of said pivoted arm, a wheel supported in said steering means, and a centrifugal clutch in the drive means for connecting the drive to the axle when a predetermined engine speed has been reached.

16. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm pivoted to one side of said A-frame for extending outwardly therefrom and for movement to a position adjacent to the other side thereof, steering means mounted on the outer end of said pivoted arm, a wheel supported in said steering means, and a centrifugal clutch in the drive means for connecting the drive to the axle when a predetermined engine speed has been reached, and a fuel tank on said cart having a conduit connected to said engine.

17. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm pivoted to said A-frame for extending outwardly therefrom and for movement to a position adjacent thereto, steering means mounted on the outer end of said pivoted arm, and a wheel supported in said steering means, said pivoted arm extending rearwardly of the A-frame to guide the cart from the rear thereof.

18. In a golf cart, an A-frame made of cross members and bracing elements, an axle having a wheel at each end, spring means connecting said axle to said A-frame, means for bracing said axle laterally and forwardly of said A-frame, an engine carried by said A-frame, drive means between said engine and said axle for driving said wheels, an arm pivoted to said A-frame for extending outwardly therefrom and for movement to a position adjacent thereto, steering means mounted on the outer end of said pivoted arm, and a wheel supported in said steering means, said pivoted arm extending forwardly of the A-frame for guiding the cart from a position forwardly of the wheel.

19. In a golf cart, a pair of wheels on an axle which supports a frame having foldable seats thereon and a foldable platform for the feet of the occupant of the seat, a pivoted arm on said frame carrying a steering wheel at its free end, steering means on said frame for turning the steering wheel, golf bag supporting elements foldable relative to the frame, and means for interconnecting the supporting elements and for applying a tension to the pivoted arm for assisting the foldable elements and arm to move against the frame with the steering wheel overlapping one of the wheels on the axis to form a compact package.

20. In a golf cart, a pair of wheels on an axle which supports a frame having foldable seats thereon and a foldable platform for the feet of the occupant of the seat, a pivoted arm on said frame carrying a steering wheel at its free end, steering means on said frame for turning the steering wheel, golf bag supporting elements foldable relative to the frame, means for interconnecting the supporting elements and for applying a tension to the pivoted arm for assisting the foldable elements and arm to move against the frame with the steering wheel overlapping one of the pair of wheels to form a compact package, an engine supported on said frame, drive means between said engine and said axle including a brake and a centrifugal clutch, a platform on said frame for the feet of the occupants, and a brake accelerator pedal on said platform for controlling the brake and the acceleration of the engine.

21. In a golf cart, a pair of wheels on an axle which supports a frame having foldable seats thereon and a foldable platform for the feet of the occupant of the seat, a pivoted arm on said frame carrying a steering wheel at its free end, steering means on said frame for turning the steering wheel, golf bag supporting elements foldable relative to the frame, means for interconnecting the supporting elements and for applying a tension to the pivoted arm for assisting the foldable elements nad arm to move against the frame with the steering wheel overlapping one of the pair of wheels to form a compact package, and latch means for securing said pivoted arm in extended steering position and in folded position.

22. In a golf cart, frame means, a pair of axles, a differential engaging adjacent ends of the axles, means for supporting the opposite ends of the axles for rotation, wheels on the ends of the axles, a single arm extending from the frame, a wheel supporting fork on the end of the arm, an engine carried by said frame, drive means including a centrifugal clutch and a brake drivingly connected to said differential, means permitting the movement of the arm and forked wheel into nested relation with said frame, foldable seat means on said frame, foldable foot support means on said frame whereby, upon the movement of the forked wheel, the seat means and the foot support means into nested relation, a compact unit is provided for storage and transportation.

References Cited by the Examiner

UNITED STATES PATENTS

| | | | |
|---|---|---|---|
| 1,005,065 | 10/1911 | Parrish | 297—433 X |
| 1,274,473 | 8/1918 | Waller | 180—27 |
| 1,321,258 | 11/1919 | Stinson | 180—27 |
| 2,182,248 | 12/1939 | Chayne | 180—73 |
| 2,445,058 | 7/1948 | Fields. | |
| 2,463,972 | 3/1949 | Jackson | 180—25 |
| 2,488,123 | 11/1949 | Hartry. | |
| 2,507,421 | 5/1950 | Rose | 180—27 |
| 2,596,250 | 5/1952 | Klinger | 280—36 X |
| 2,705,156 | 3/1955 | Torre | 280—287 |
| 2,962,106 | 11/1960 | Burnside et al. | |
| 3,004,619 | 10/1961 | Straussler | 280—36 X |
| 3,043,389 | 7/1962 | Steinberg | 180—27 |
| 3,094,187 | 6/1963 | Horowitz. | |
| 3,096,842 | 7/1963 | Westmont | 180—27 X |

FOREIGN PATENTS

| | | |
|---|---|---|
| 1,011,087 | 4/1952 | France. |
| 748,347 | 4/1956 | Great Britain. |
| 897,646 | 5/1962 | Great Britain. |
| 417,100 | 7/1947 | Italy. |

KENNETH H. BETTS, *Primary Examiner.*